July 3, 1928. Re. 17,023
E. E. CLEMENT
RADIO METERING SYSTEM
Original Filed Aug. 14, 1922
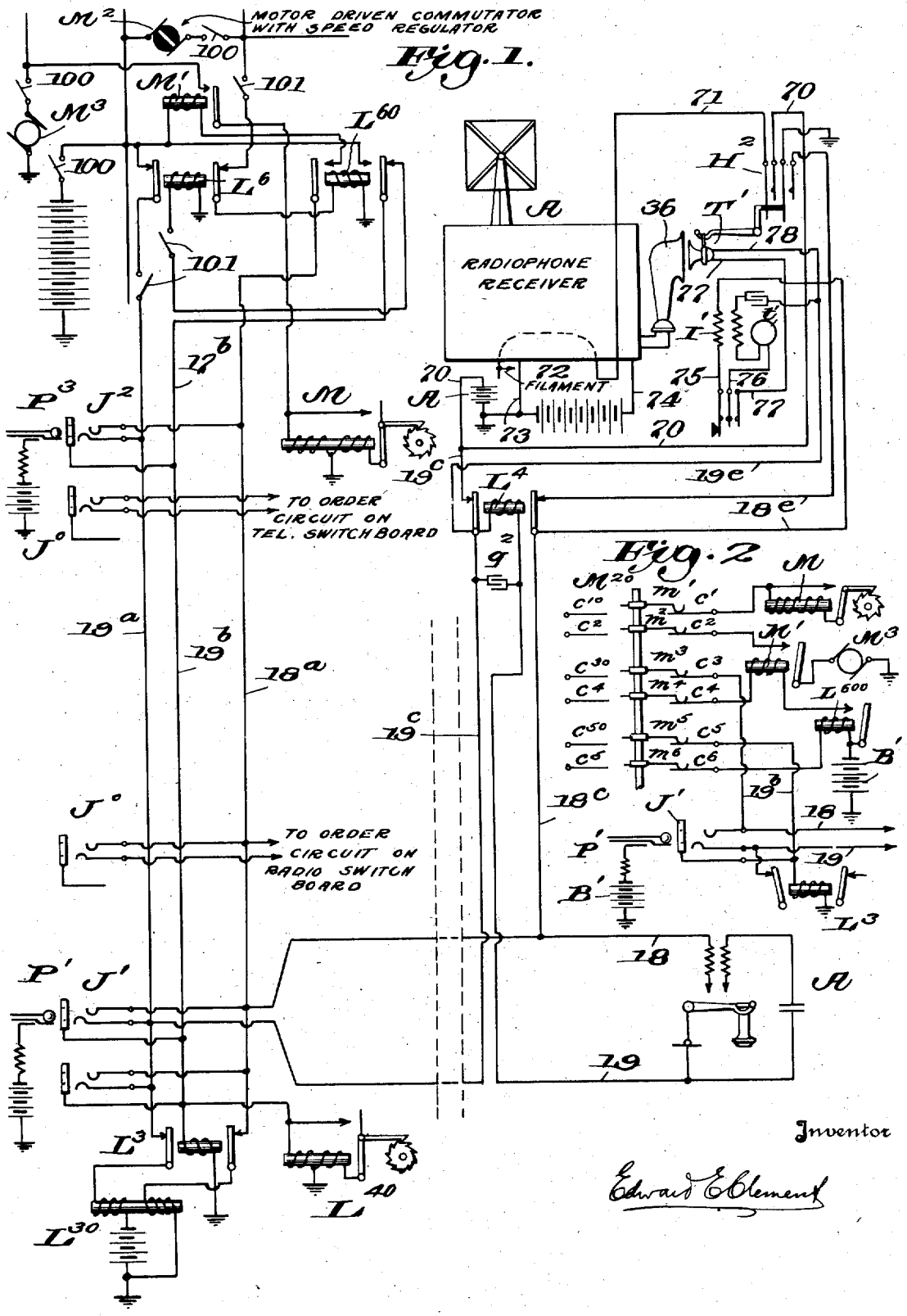
Inventor
Edward E. Clement Reissued July 3, 1928. Re. 17,023

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

RADIO METERING SYSTEM.

Original No. 1,522,359, dated January 6, 1925, Serial No. 581,831, filed August 14, 1922. Application for reissue filed January 6, 1927. Serial No. 159,460.

This invention relates to radio systems, and has for its object the production of such a system in which service can be rendered subscribers on a metered basis, as in telephone exchange systems. This object is attained by connecting the radio stations with a central station by wire lines, which may be existing telephone lines, and causing the condition of use or disuse of the radio apparatus to produce changes in the wire lines which will cause the operation of individual line metering apparatus at the central station, so as to register the amount of such use at each substation. This system of metering is particularly adapted for use with an exchange broadcasting system such as that described in my co-pending application executed and filed of even date herewith, Serial No. 581.829, patented as No. 1,522,357, granted January 6, 1925.

My invention is illustrated in the accompanying drawing, in which:

Fig. 1 is a diagram of a combined wire and radio system equipped with individual station meters at the central office; and Fig. 2 is a fragmentary diagram of a modification.

Referring to the drawing, A is a subscriber's station equipped with telephone instruments for talking and signaling over the line wires 18—19. A′ is the radiophone substation of the same subscriber, containing a radio receiver, batteries $A_1$ and $B_1$, an extension telephone set T′—$t'$, controlled by a switch $h'$, and a switch hook $H^2$ controlling the filament circuit and also placing a ground on the tip conductor 18 of the line when the radio receiver is in use. The extensions of line wires 18—19 to the radiophone are controlled by a cut off relay $L^4$ and shunting condenser $q^2$, said relay being energized by line current when the line is in use telephonically. Extension wire $19^c$ is connected to the bus wire 70 of the battery $A_1$, and extension wire $18^c$ goes to the switch hook $H^2$ by which it is grounded when the radiophone is in use. Branch wires $18^e$ and $19^e$ pass from the relay $L^4$ as direct continuations of line wires to the telephone set T′—$t'$. Wire $18^e$ goes to the induction coil I′ and by wire 75 to the switch $h'$. Wire $19^e$ goes to the transmitter T′ and thence by wire 77 to the switch $h'$. A branch wire $19^e$ goes through a condenser to the secondary of the induction coil, thence to the receiver $t'$ and by wire 76 to the switch $h'$. The instruments T′, $t'$ may conveniently be mounted on a connecting handle containing the switch $h'$, and the transmitter end of this assembly may then be provided with an eye so that it may be hung up on the hook $H^2$. Such an assemblage of telephone transmitter and receiver is shown for example in Letters Patent No. 1,382,273, granted June 21, 1921, to W. W. Dean.

At the central office the line wires 18—19 terminate on multiple jacks J′ with which cooperate plugs typified by P′, for telephonic connections. Multiple wires $18^a$, $19^a$ and $19^b$ are carried to the radio switchboard where they terminate on jack $J^2$, the sleeve wire being continued through a back contact of cut off relay $L^6$ to the bus bar of the main battery B′, while the tip wire is continued through a normally open contact of the relay $L^{60}$ to the winding of a meter test relay M′, the other side of which is connected to the bus bar of the battery B′. The batteries B and B′ are balanced and do not produce an operative flow of current through the winding $L^{30}$ of the relay $L^3$, due to the line conductor resistance being greater than that of the conductor $19^a$, which is negligible. It is to be understood also that the batteries B and B′ are of substantially the same voltage, since it is not the battery B′ but the generator $M^3$ which works the meters. The metering commutator $M^2$ closes a circuit from winding of relay $L^{60}$ to the bus bar of the battery B′ periodically, at intervals determined according to the nature of the service and the charge to be made therefor. For example, if a charge of five cents is to be made for every fifteen minutes of use of the radio receivers at the substations, then the meter commutator $M^2$ should make one half rotation every fifteen minutes, and at the end of every such period the relay $L^{60}$ will be energized, and relay M′ will be supplied with battery current whereby if there is a ground on wire $18^c$ at the radiophone substation, said relay M′ will pull up and register one unit of time or one unit charge on the line meter. It will be understood of course that the relays M′ and $L^6$ and $L^{60}$ in this case are individual to the line and to the substation, but that the meter commutator $M^2$, the battery B′ and the high voltage generator $M^3$ for supplying meter current, may all be common to the entire exchange. The relay $L^{60}$ is responsive to the commutator $M^2$ only when cut off relay $L^6$ is deenergized, and its action is momentary, disabling the cut off relay $L^6$ but energizing the cut off relay $L^3$ on the telephonic switchboard so as to leave the tip side of line clear. If a plug is in any jack, however, relay $L^6$ is energized thereby as well as relay $L^3$, and relay $L^{60}$ is disabled, so that when a line is connected the meter will not register. This is necessary in order to avoid false grounds through the cord circuits. The meter M shown in Fig. 1 is a standard telephone line meter having one high winding and one low winding, the high winding being first energized from the generator $M^3$ when the relay M′ pulls up its armature, the construction of the meter being such that when its armature is closed against the contact point shown, the high winding will be shunted by the low winding, whereby sufficient power to turn the meter ratchet is assured.

While the wire lines are in use for conversation, the cut off relays $L^3$ and $L^6$ must be energized, and at such times the metering system is disconnected for the moment from the telephone line. Furthermore, as there will be periods for which no charge should be made, such as those in which a program is announced, weather reports are given, and the like, a master switch is provided at 100 for disconnecting the common metering apparatus. When this switch is open, any service rendered will be free.

When it is desired to increase the charge, as for example for special programs, or the like, the metering commutator $M^2$ is speeded up accordingly, so that it will record more units in a given on the station M. The adjustment of the metering commutator takes care of this contingency automatically. To disable the meter circuit on an individual line, I provide a switch 101, which may be a single unit, but is indicated in the diagram by separate switch units No. 101 for each wire. When open the test relay has no access to the line and any service rendered is therefore free.

It will be noted that communication between the operators on the telephone switchboard and those on the radio switchboard, respectively, is by means of an order circuit or circuits. The reason for this is that the extension phones T′—t′ at the radio substation will most frequently be used for access to the radio operator, and when a call of this character is made, the answering operator on the telephone switchboard will not trunk it through, but will instruct the radio operator over the order circuit, giving the number of the calling line, so that the radio operator may go in on that line by means of his plug $P^3$. For outgoing calls to the radio substation, the radio operator of course has direct access to the line through the jacks $J^2$.

In Fig. 2 I have shown the metering apparatus connected through and controlled by a driven automatic switch $M^{20}$, which takes the place of the commutator $M^2$ and also renders individual relays $L^6$ and $L^{60}$ unnecessary. On a central spindle $m$ are mounted wipers $m'$, $m^2$, $m^3$, $m^4$, $m^5$, $m^6$, in connected pairs insulated from the spindle and from each other. These are rotated by the driven spindle $m$ around circular contact banks $c'$ $c^2$, $c^3$, $c^4$, $c^5$, $c^6$, respectively. The bank contacts $c^2$, $c^4$, and $c^6$ are solid rings extending around the circle while the contacts $c'$, $c^3$, etc., typify circular series of individual contacts, each set connected to tap wires from an individual line as indicated. Contact $c'$ is connected to the individual line meter M which is the same in every particular as the meter M in Fig. 1, and located the same. Contact $c^2$ is connected to the meter generator $M^3$; contact $c^3$ is connected to the tip side of line 18 for test; contact $c^4$ is connected to winding of test relay M′, which in this case is common to all the lines and brought into connection with each in turn as the switch $M^{20}$ is rotated; contact $c^5$ is connected to the wire $19^b$ leading to test rings of jacks J′, $J^2$ and to the windings of cut off relay $L^3$; and contact $c^6$ is connected to the windings of a sleeve test relay $L^{600}$, the other side of which is connected to battery.

The switch rotates only when it is desired to meter the service. At other times it is idle and the wipers $m'$, $m^2$, etc., rest on dead points, so that no lines are connected to them. While metering, the switch is driven at such speed and at such intervals as the predetermined rate of charge requires, as heretofore explained, and brings line after line under test to ascertain if its radio receiving set is in service and if so, register a unit charge for each rotation. If a line is not in use telephonically, and its radio set is in use, when the wipers come on its contacts the relay $L^{600}$ will pull up in series with the line cut-off relay $L^3$ and relay M′ will get current from battery B′ through tip side 18 of line to ground at the radio station switch hook $H^2$, closing circuit from meter generator $M^3$ through contacts $m^2$ and $m'$ to line meter M.

If the line is in use telephonically, with a plug in a jack, the test of the wire $19^b$ by wiper $c^5$ will find battery potential thereon from the cord battery connection to B or B′; hence relay $L^{600}$ will not be energized, and the meter M will not be actuated.

Switches of this type may also be employed to connect the radio operator to the lines for control, conversation, etc., taking the place of jacks $J^2$ and plugs $P^3$. In such case the operators may have dials or keyboards for actuating the selective switches, as well understood in the telephonic art.

In operation, when the radiophone receiver at the subscriber's station is in use, the instrument T′—t′ is lifted off the switch hook, in order to close the filament circuit, and thereby the contacts of the switch hook $H^2$ ground the wire $18^c$ and produce a grounded circuit through to the central office over the tip side of the telephone line as follows: ground at switch hook $H^2$, wire $18^c$, line wire 18, branch tip conductor $18^a$ at the central office, to the radio switchboard, contacts of relay $L^{60}$, winding of relay M′, switch 100, battery B′, and to ground. During the program period, the commutator $M^2$ is continuously operated, and at periodic intervals closes the following circuit: battery B′, switch 100, commutator $M^2$, switch 100, switch 101, contacts of relay $L^5$, winding of relay $L^{60}$ to ground. This energizes the relay $L^{60}$, which closes its contacts, and as there is a grounded circuit otherwise complete to the windings of relay M′, the latter becomes energized and closes the meter circuit of the particular line in question, as follows: generator $M^3$, switch 100, contacts of relay M′, to high resistance winding of meter M, and to ground. The meter will start to pull up, and before the strain of turning the dial becomes apparent, its armature will close a short circuit through its low resistance winding, whereupon a rush of current will ensue from the generator $M^3$ as follows: $M^3$, contacts of relay M′, windings of M, and ground, back to generator. The consequent energization is sufficient to actuate the meter, and record one unit of use.

When the subscriber has finished using his radiophone, he may hang up the instrument T′—t′ on the switch hook, thereby breaking apart the contacts of $H^2$, and taking the ground off the wire $18^c$. Obviously, there being then no grounded circuit for the relay M′ at central, the periodic energization of relay $L^{60}$ will produce no result, and no time-use will be recorded against the line in question. However, it may happen that the subscriber through forgetfulness or intent, will leave his switch hook $H^2$ in its operative or grounding position. This would result in constant metering of time charges against him, were it not for the master switches 100, which as heretofore described are supposed to be opened during nonradiating periods. Consequently, the subscriber would be charged only for actual program periods, even though he left his instrument constantly connected for use. It is known that in ordinary radio practice, where receiving instruments are installed in public places, that the filament circuits and the loud speaker circuits are frequently left closed continuously, but in such ordinary practice there is no metering of the service, and as I consider the apparatus and methods herein described to be broadly as well as specifically original with me, I shall claim the same accordingly, including in my claims the feature of disabling all meters, or any particular meters, after they are enabled at the subscriber's station, so as to prevent overcharging.

A further statement of operation it is thought need not be given, as the radiophone receiving apparatus and the circuits with which the same is connected, form no part in themselves of the present invention, except as they are used in combination with the parts necessary for metering. The telephone switch board circuits shown herein are standard Western Electric No. 1, so known in the art, and are equipped with the usual line meters $L^{40}$, which are energized through the cord circuit by an operator, who ordinarily applies a high voltage generator to the high winding of the meter to be actuated, and thereupon produces sufficient energization to close the circuit of the low winding, which in turn receives a rush of current from the main battery and actuates the meter. This is precisely the same as the operation of the meter M hereinbefore described. It is to be particularly noted that while I have made it possible by the means disclosed herein to energize separate telephone and radiophone meters over the same wires, I have made such separate radio meters irresponsive to any telephonic use of the lines 18—19, or the telephone switch board circuits J′—P′, or the telephone meters $L^{40}$. At the same time, I have rendered it possible to separately control radiophone meters without interference with any of the aforesaid telephone apparatus, including the telephone meters, and all this I believe to be novel and original with myself and shall make it the subject matter of claims accordingly.

The expression "a radio central station" used in the claims hereinafter is not to be construed as a limitation to a separate radio central station in the sense of a broadcasting or operating station. For example, it may be conducted simply as a department of a telephone central station.

I claim:

1. A system for rendering measured radio service in combination with telephone service, comprising a plurality of subscribers' stations, a telephone central station, wire lines interconnecting them, a radio central station having access to and means for connecting with said wire telephone lines, a plurality of radio subscribers' receiving stations also having access to and associated with said wire telephone lines, radio receiving apparatus at each subscriber's station, means controlled in the use of said apparatus to produce a change in the condition of the wire line leading from said substation, and metering means at the central station responsive to such changed condition of the line to register the use of the substation radio apparatus, but irresponsive to any changes produced in the use of the telephone apparatus as such.

2. The system claimed in claim 1, with means to actuate the central station metering means periodically, to measure time of use.

3. The system claimed in claim 1, with individual station meters at the central station, and periodic actuating means therefor.

4. The system claimed in claim 1, with variable speed actuating means for the meters, whereby the rate charged may be varied according to the character and value of the service rendered, by registering more or less time units in a given period.

5. The system claimed in claim 1, with the wire lines connected to telephone apparatus at the subscribers' stations and to a telephone switchboard at the central station, means normally, when the lines are telephonically idle, connecting them for radio use, but acting to disable the radio connections to said lines when the substations are in use telephonically.

6. The system claimed in claim 1 in which there are means at each substation for starting its meter when receiving and means at the central station for disabling or stopping said meter.

7. A system for rendering measured radio service, comprising a central station, a plurality of substations containing radio receiving apparatus, a plurality of individual meters for said substations, means at each substation for individually starting its meter when receiving radio matter and means at the central station common to all the substations, for disabling or stopping all of said meters, whereby periods of free service may be determined by the central office exclusively.

8. A system for rendering measured radio service, comprising a central station, a plurality of substations containing radio receiving apparatus, a plurality of individual meters for said substations, all located at the central station, means at each substation for individually connecting its meter for operation, and means at the central station for actuating, controlling and disabling said meters individually and collectively.

9. A system for measuring and supervising received broadcast matter which comprises a central station, a plurality of subscribers' stations, wire lines interconnecting them with the central station, a supervisory station having access to and means for connecting with said wire lines through said central station, a plurality of broadcast subscribers' receiving stations having access to and associated with said wire lines, high frequency wave-receiving-and-detecting apparatus at each subscriber's station, means for relaying the detected waves from said receiving apparatus through the wire lines leading to the central station, means controlled in the use of each receiving apparatus to produce a change in the condition of the wire line leading from its substation to the central station, and metering means at the central station responsive to such changed condition of the line to register the use of the substation high frequency apparatus.

10. A combined system for intercommunicating and for measuring and supervising received broadcast matter which comprises a central station, a plurality of subscribers' stations, wired circuits interconnecting the same with the central station, a supervisory station having access to and means for connecting with said wired circuits, high frequency wave receiving and detecting apparatus at each subscriber's station, means for rendering intercommunicating service independent of the broadcast receiving over said wired circuits, meters associated with the respective subscribers' stations for measuring such intercommunicating service, and other meters separately controlled by the subscribers for separately metering the broadcast matter received at each station.

11. A double service system comprising wired circuits, subscribers' stations connected therewith, a central station also connected therewith, means at the central station for rendering service over the wires, means at each subscriber's station for receiving and utilizing said service, and meters associated with said subscribers' stations adapted to register this primary use of said circuits, high frequency wave receiving and detecting apparatus also located at each subscriber's station, and other meters associated with the several subscribers' stations, with actuating circuits therefor, and means controlled in the use of said high frequency apparatus only to produce a change in the condition of said meter circuits to register the use of the substation high frequency apparatus.

12. A double service system comprising wired circuits, subscribers' stations connected therewith, a central station also connected therewith, means at the central station for rendering service over the wires, means at each subscriber's station for receiving and utilizing said service, and meters associated with said subscribers' stations adapted to register this primary use of said circuits, high frequency wave receiving and detecting apparatus also located at each subscriber's station, and other meters associated with the several subscribers' stations, with actuating circuits therefor, and means controlled in the use of said high frequency apparatus only to produce a change in the condition of said meter circuits to register the use of the substation high frequency apparatus, said first set of meters being irresponsive to any change produced by the use of high frequency apparatus at the subscriber's station, and said second set of meters being irresponsive to any primary use of the wires by the subscribers.

13. A system for measuring and supervising received broadcast matter which comprises a plurality of subscribers' stations, a low frequency central station, wire circuits interconnecting them, means at said central station for supplying primary service to said subscribers' stations over said wired circuits, and means for metering the same, a high frequency central station having access to and means for connecting with said wired circuits a plurality of high frequency wave receiving and detecting apparatus at subscribers' stations, and metering means therefor, together with means operable in the use of the respective low frequency and high frequency service, to differentially and separately operate said low frequency metering means and said high frequency metering means each exclusively of the other, according to the service received.

14. A system for measuring and supervising received broadcast matter which comprises a plurality of subscribers' stations, a low frequency central station, wire circuits interconnecting them, means at said central station for supplying primary service to said subscribers' stations over said wired circuits, and means for metering the same, a high frequency central station having access to and means for connecting with said wired circuits a plurality of high frequency wave receiving and detecting apparatus at subscribers' stations, and metering means therefor, said low frequency metering means being controlled at the low frequency central station, and the high frequency metering means being controlled by the subscriber, differentially and exclusively.

15. A system for measuring received broadcast matter comprising a central station, a plurality of substations and wired circuits interconnecting the same, double service mechanical and electrical equipment adapted for low frequency and for high frequency communication respectively at each substation, and separate means for separately metering the high frequency and the low frequency communications without interference.

16. A duplex measuring service system comprising a central station, subscriber stations, and wire lines interconnecting the same, with means for furnishing two distinct and separate classes of service over the said circuits in common and other means separately identified with each circuit of each line for metering a use of said circuit by the subscriber.

17. The method of rendering a plurality of diverse measured services over the same wired circuits which consists in operating one service at high frequencies and another service at low frequencies, and identifying separate metering devices with each class of operation, one set being actuated in the high frequency operation only and the other set of meters being actuated in the low frequency operation only.

18. In a metering system, a plurality of lines and substations, a central station containing terminals of said lines, and automatic switching devices adapted to be continuously driven around over the contacts of the respective lines, metering means associated with the several lines and connected to contacts in said switch identified with the line contacts, and automatic means controlled by each subscriber for energizing his line meter each time that the switch comes into selective association with his line contacts so long as his line remains in use.

19. A metering system comprising sets of bank contacts associated with line circuits leading to substations, and movable contacts successively engaging said sets of bank contacts, a meter for each line, an energizing relay therefor and testing or identifying means, said movable contacts being common to a group of lines, and means whereby the meter will be actuated each time said movable contacts make a cycle of operation while its line is in use whereby the time use of each line will be metered in units measured by the periodicity of movement of the movable contacts.

20. A metering system for wired circuits adapted by multiplexing for different classes of service, comprising meters differentially identified with whatever classes of service for the same lines respectively and subscriber controlled selective means for differentially actuating said meters in accordance with the class of service to be metered.

In testimony whereof I hereunto affix my signature.

EDWARD E. CLEMENT.